United States Patent

Cargile

[15] 3,662,380

[45] May 9, 1972

[54] TRANSIENT RECORDER

[72] Inventor: William P. Cargile, La Honda, Calif.

[73] Assignee: Biomation, Inc., Palo Alto, Calif.

[22] Filed: Mar. 2, 1970

[21] Appl. No.: 16,628

[52] U.S. Cl. ....................................340/347 AD, 340/172.5

[51] Int. Cl. ....................................................H03r 13/02

[58] Field of Search .................340/347 AD, 172.5; 235/154

[56] References Cited

UNITED STATES PATENTS

| | | | |
|---|---|---|---|
| 3,230,358 | 1/1966 | Davis et al. | 340/347 AD X |
| 2,922,151 | 1/1960 | Reiling | 340/347 AD |
| 3,516,071 | 6/1970 | Roos | 340/172.5 |
| 3,185,820 | 5/1965 | Williams et al. | 340/347 AD X |
| 3,345,617 | 10/1967 | Cox, Jr. et al. | 340/172.5 |
| 3,274,559 | 9/1966 | Giroux et al. | 340/172.5 |

*Primary Examiner*—Thomas A. Robinson
*Attorney*—Limbach, Limbach & Sutton

[57] ABSTRACT

An analog transient signal is converted to a Gray digital code and is read into a recirculating MOS storage device. The memory is controlled by a triggering system so as to hold any desired portion of the transient signal. A slow readout from the memory is converted to a straight binary code that may be applied to a digital computer. The binary signal is further applied to a digital-to-analog converter for connection to an oscilloscope or mechanical plotter.

19 Claims, 9 Drawing Figures

INVENTOR.
WILLIAM P. CARGILE

BY Limbach, Limbach and Sutton

ATTORNEYS

INVENTOR
WILLIAM P. CARGILE
BY Limbach, Limbach and Sutton
ATTORNEYS

INVENTOR.
WILLIAM P. CARGILE
BY Limbach, Limbach & Sutton
ATTORNEYS

INVENTOR.
WILLIAM P. CARGILE
BY
Limbach, Limbach and Sutton
ATTORNEYS

TRANSIENT RECORDER

BACKGROUND OF THE INVENTION

The invention relates generally to information storage devices and more particularly to apparatus for storing fast transient signals indefinitely with a slow speed read-out capability.

Recording non-recurring or transient signals has always been a problem in many areas of electronics, physics, chemistry and life science research. Many techniques have been developed which range from the use of XY recorders for very slow signals (present speed is limited to a writing rate [slewing rate] of 75 cm/sec) to the use of high speed storage oscilloscopes with a normal writing rate of 1 cm/μsec. Unfortunately, obtaining high frequency response in both cases is affected by the amplitude needed for satisfactory viewing as well as the period or length of the signal to be observed. Thus, a display of 6 cm amplitude with 1 full cycle shown in 10 cm gives a frequency limit of 4 Hz for the XY recorder and 50 kHz for the normal storage oscilloscope. Higher frequency responses can be achieved by using a smaller amplitude display with more complete cycles in the same 10 cm display area. Thus, for a 2 cm amplitude and 5 complete cycles in the same 10 cm, the respective responses are 12 Hz and 160 kHz. Some higher speed storage oscilloscopes could have a 1 mHz response under these latter conditions but pay a severe price in tube life. In the cases of both the XY recorder and the storage scope, the units are limited because of the need to directly display the signal, since no electronic storage capability exists which can capture the high speed signal and present it at a slower speed.

Other recording techniques such as strip chart recorders and optical recorders have responses within these range limits. Analog type recorders have frequency responses to 5.0 mHz but must be run continuously to capture transient signals and are relatively expensive. High speed film used in cameras attached to normal oscilloscopes have high writing rates and frequency responses. However, they are not convenient to use since the signal cannot be viewed directly and the film requires developing time.

As a result of these considerations, the high speed storage oscilloscope is the instrument most frequently used in these applications. This is true despite its problems of limited frequency response for reasonable viewing area, limited storage and viewing time as contrast decays, high cost of the basic unit, and limited life of the storage tube itself.

SUMMARY OF THE INVENTION

The transient recorder is specifically designed to capture single shot signals and hold them indefinitely. Only one signal is necessary. It eliminates the storage scope limitations by using a high speed MOS memory to store the transient data indefinitely and to present it for viewing on conventionally slower devices at a slower sweep speed and any desired amplitude. In a preferred embodiment a 6 bit high speed analog to digital converter operates at 10 mHz word conversion rate to convert the input data to binary form. The result is that a 1 mHz signal can be easily recorded (with 10 point per cycle definition) and later represented on any other slow recording or display unit. The input amplifier has a greater than 1 mHz bandwidth at the 3 db point. 128 successive samples are taken, converted, and stored in digital form. The input sweep time can be varied from 10 sec to 5 sec, with the output sweep time set at 10 seconds for XY recorders or 0.2 ms for oscilloscopic display. The output can be taken digitally into a computer or other digital device, or in analog form, after processing in a digital to analog converter which also incorporates a smoothing circuit. The resulting analog output does not show the abrupt steps sometimes associated with analog versions of digitally recorded data because of the smoothing used.

In addition to the normal recording applications where storage oscilloscopes are now frequently used, it can be used as an inexpensive peripheral input device which performs the analog to digital conversion of a fast input signal and stores the results until a computer is ready to accept the data. It then presents the digital data to the computer at a compatible rate. Since computers are finding increased applications in signal averaging and digital signal analysis but are limited by their data input rates, this device will allow them to have the same speed as present hard-wired signal analyzers.

Triggering of the unit is accomplished either externally or by use of transient signal being recorded. A variable delay allows positioning of the sweep "window" at the proper time relative to the trigger for those applications where a relatively fast sweep is desired to give good resolution of a signal which occurs a long period after the trigger. Pre-trigger recording, which allows recording of the information prior to receipt of the signal, can also be accomplished by operating the analog to digital converter in a free-running mode with the resulting digital data being passed through the MOS shift register memory. When the trigger is received, the data acquisition can be stopped immediately or after a variable delay period, with the result that the information retained in the memory is for the period before, during, or after the signal which served as the trigger. This mode is especially useful where no external trigger is available, such as EKG analysis in medical research work, and eliminates the need for a delay line.

It can be connected directly to all known oscilloscopes or display devices since it generates an external sweep ramp as well as the analog Y output, thus making them all 1 mHz storage oscilloscopes with writing rate no longer limiting their frequency response.

DESCRIPTION OF THE PREFERRED EMBODIMENTS

Figure 1:
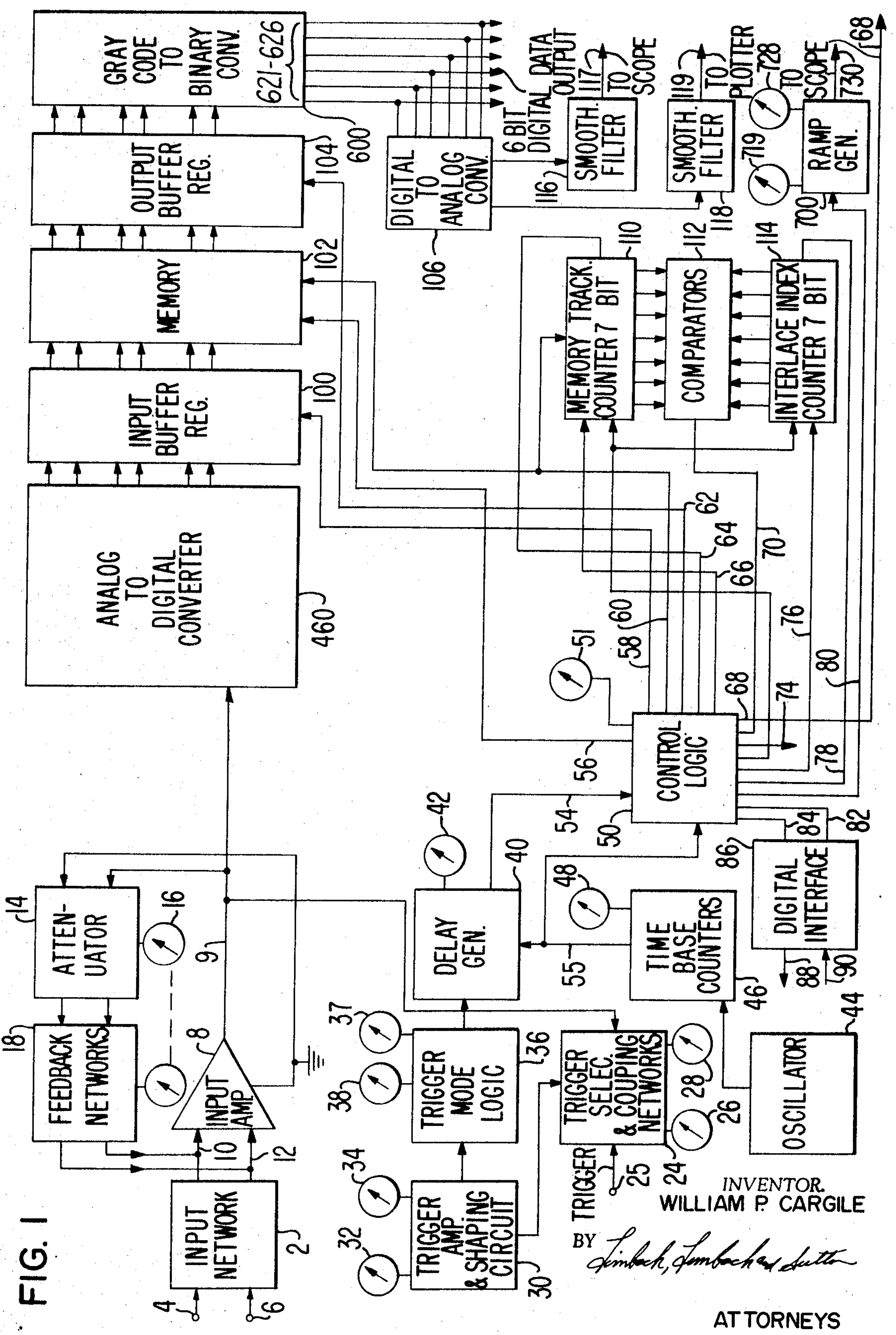
FIG. 1 is a block diagram of a preferred embodiment of the transient recorder of this invention.

Referring now to FIG. 1, an external analog input is applied to a passive RC input network 2 at inverted and non-inverted input terminals 4 and 6. The signal is applied to input terminals 10 and 12, of a high gain operational amplifier 8. A feedback network including switchable attenuators 14 and switchable RC feedback networks 18 is connected between the amplifier 8 dual outputs and dual inputs. A ganged input range switch 16 switches units 14 and 18 in order to determine the amplifier 8 gain. The amplifier 8 positive output on line 9 is applied to a trigger selection and coupling network circuit 24 and to an analog-to-digital (A/D) converter 460. The operation of the triggering circuits will be discussed below.

A/D converter 460 provides a six-bit Gray code output to input buffer register 100 which may be six flip flops, for example. Converter 460 is described in detail in the discussion of FIG. 2. Buffer 100 reads a six-bit Gray code word into memory 102 upon command from control logic 50, which will be explained in more detail hereinafter. It would be possible to omit buffer 100 in which case the memory would simply absorb the A/D converter output as fast as it could. This is possible because the A/D converter is unclocked. Memory 102 may be any sequential access memory as "wide" (having the same word bit length capacity) as the A/D converter. In theory, a random access memory could be used but it would be more expensive. In a practice embodiment the memory is comprised of 12 64 bit long MOS shift registers multiplexed to obtain a 6 bit × 128 word long memory. Thus memory 102 is a 128 word recirculating shift register. As will be seen below, the read-in and read-out of memory 102 is controlled by control logic 50 operating in conjunction with a memory track counter 110, comparators 112, and an interlace index 114. An output buffer register 104, which may also be six flip flops receives the memory 102 output and applies it to a Gray code to binary code converter 600. Converter 600 is described in greater detail in the discussion of FIG. 4. The binary output is available on digital output lines 621–626 for use by a computer, for example. The binary output is also applied to a conventional digital-to-analog (D/A) converter 106 to provide either a fast analog output through a smoothing filter 116 to output 117 for connection to the *y* input of an external oscilloscope or a slow output 119 for connection to an external mechanical plotter such as an *x-y* plotter or strip chart.

Referring again to the triggering function, trigger selector and coupling networks unit 24 selects either the amplifier output signal on line 9 for internal triggering or an external trigger signal on line 25 by means of trigger source switch 26. A trigger coupling switch 28 adjusts the coupling networks so as to discriminate against high frequency or low frequency signals to eliminate 60 Hz hum, for example. The trigger signal thus chosen and filtered is applied to trigger amplifier and shaping circuit 30. Control 32 is a trigger slope switch; control 34 is a trigger level control. The triggering functions thus far described are conventional in oscilloscope circuits.

A triggering mode logic circuit 36 having a record sweep switch 37 and a trigger mode switch 38 receives the signal from circuit 30 and applies it to a delay generator 40 which may be a one-shot, for example. Trigger holdoff control 42 controls the delay time of the trigger signal on line 54 which is applied to control logic 50.

Record sweep switch 37 provides for three ways of generating a trigger signal on line 54; in the absence of a trigger signal the unit is in a playback mode; that is, no data is being read into memory 102 and the memory is recirculating whatever data it contains for application to the unit's outputs. In the "automatic (auto) record sweep" position, a trigger pulse is periodically generated in order to update the memory. This function is useful for initially adjusting the unit. In the "normal record sweep" position, whenever a trigger pulse is generated in response to the external trigger input or the signal itself, recording commences. Recording will take place every time the triggering occurs. In the "single sweep record" position, recording only occurs in response to the first trigger.

Four triggering modes are selectable by switch 38 normal, trigger holdoff, delayed sweep record, and pre-trigger record. The first three modes are analogous to oscilloscope operation (as are the three ways of triggering by switch 37); the fourth is unique to the invention. In the normal mode, the trigger pulse initiates recording. To illustrate the second mode, suppose a desired signal is followed closely by an undesired signal, the trigger may be inhibited for an adjustable time period by adjusting the trigger holdoff control 42. In the delayed sweep mode, a desired signal may follow an undesired signal by a particular time. The first signal may be used to trigger a variable delay (selected by control 42) in order to generate a trigger pulse to initiate recording at the end of the delay period. In the pre-trigger mode, the unit is set to continuously record, always having the last 128 words at any given time. Recording is stopped upon generation of a trigger pulse on line 54, thus preserving the previous part of the signal. If desired the time delay may be inserted so as to record portions of the signal before and after the trigger.

Implementation of the triggering functions described may be accomplished in many different forms by well-known circuit logic techniques within the ordinary skill in this art.

A stable oscillator 44 such as a crystal oscillator drives a series of counters 46 of seven decades. The counters count down from the oscillator frequency, which may be 20 mHz, for example, and by switching sweep record time switch 48, the clock pulse rate on line 55 may be varied. Switch 48, by varying the clock rate, determines the "time width" of the memory. That is, the sweep record time determines the length of time of the input signal that will be represented by the 128 words in memory 102. As will be seen below the sweep record time does not always have a direct relationship to the memory speed. The clock signals on line 55 are also applied to delay generator 40.

The speed of memory 102 is controlled over the line 60 by control logic 50. The pulses on line 58 to the input buffer run at the same rate, but lead by one clock pulse. The recirculate control signal on line 56 connects the memory output to its input in order to recirculate the contents as during playback. Memory 102 cannot operate below a particular speed because of the capacitive storage nature of the MOS devices. Thus, for read-in speeds above that speed and up to the maximum memory speed, the data may be directly read into the memory. However, for read-in speeds below that speed a means for interlacing the data is provided. In other words, if memory 102 is used as a 128 word recirculating storage unit, and if the storage compartments are numbered 1 to 128, then a first sample could be read into compartment 1, a second sample could be read into compartment 2 on the second cycle, and so on. Thus data may be interlaced into the memory every cycle or every second cycle, or third cycle, etc., depending on how slow a read-in rate is chosen. In order to provide this interlace function, memory track counter 110 also receives the memory clock pulses on line 60. The counter contents indicate the address of data available at the input/output of the memory. As will be described below, the interlace technique is also used to provide the slow read-out system required for external display and storage devices. Interlace index counter 114 indicates the memory address at which the next word is to be inserted or removed. Comparator 112, which may be exclusive-OR gates, compare each bit in counters 110 and 114 and provide a coincidence signal on line 70 when each bit is identical. Because the memory has a capacity of 128 words, counters 110 and 114 must have a 7-bit capacity ($2^7$=128). The coincidence signal is used by control logic 50 to control input buffer 100 on line 58 and output buffer 104 on line 62. Counters 110 and 114 are reset as necessary by line 72 from control logic 50. Memory track counter 110 receives an advance pulse on line 66 and provides an overflow pulse (indicating roll over) on line 64 to the control logic unit 50. Interlace index counter 114 receives an advance pulse on line 76 and sends an overflow pulse on line 78 to control logic 50. Control logic 50 also provides a retrace blanking signal for an external oscilloscope on line 68. Line 74 provides a plot command signal for *x-y* or strip chart recorders.

It has been found that MOS memories cannot drive a significant capacitive load at their output. This adversely affects their output speed, making it possible to have a higher input speed than output speed. This effect can be readily utilized in the present device because the input data is very fast, whereas the output taken is relatively slow for the external devices.

A digital interface control logic circuit 86 sends a control signal on line 82 and receives a control signal on line 84 from the control logic. Line 88 provides a data available flag signal and line 90 receives a data request command signal from a computer or digital recorder.

Control logic 50 also provides a sweep restart signal on line 80 to the ramp generator 700. The generator is described in greater detail in the discussion of FIG. 5. An output 730 is provided for the horizontal input of an external oscilloscope. Control 719 affects the horizontal position and control 728 provides sweep expansion. For playback to an oscilloscope only 100 of the 128 words stored in memory 102 are used. The remaining time is used for retrace blanking. This provides a convenient relationship to base 10 for oscilloscope use.

In operation, a number of options are possible; assume that the input analog signal is very fast. The sweep time switch is set for a very high sampling speed in order to take sufficient samples of the signal so that it may be reconstructed. The trigger source switch would be set for internal trigger and the trigger slope and trigger level would be set to trigger at the leading edge of the signal. The trigger is set at single sweep record and the trigger mode switch is set to normal. Thus upon triggering, the analog signal converted into Gray code would be read into memory 102 until the memory is filled at which time the memory tracking counter would signal an overflow on line 64 and no further data would be read into the memory because control logic 50 would inhibit the output from input buffer 100. Memory 102 now has 128 words recirculating which represent the fast sample taken of the input signal. Immediately upon cessation of recording, the unit automatically switches to the playback mode. Switch 51 on control logic 50 selects the read-out speed which may be three different rates compatible with an oscilloscope, a mechanical plotter, or a digital computer. The switch causes a slow read-out by using the interlace technique described above.

Figure 2:
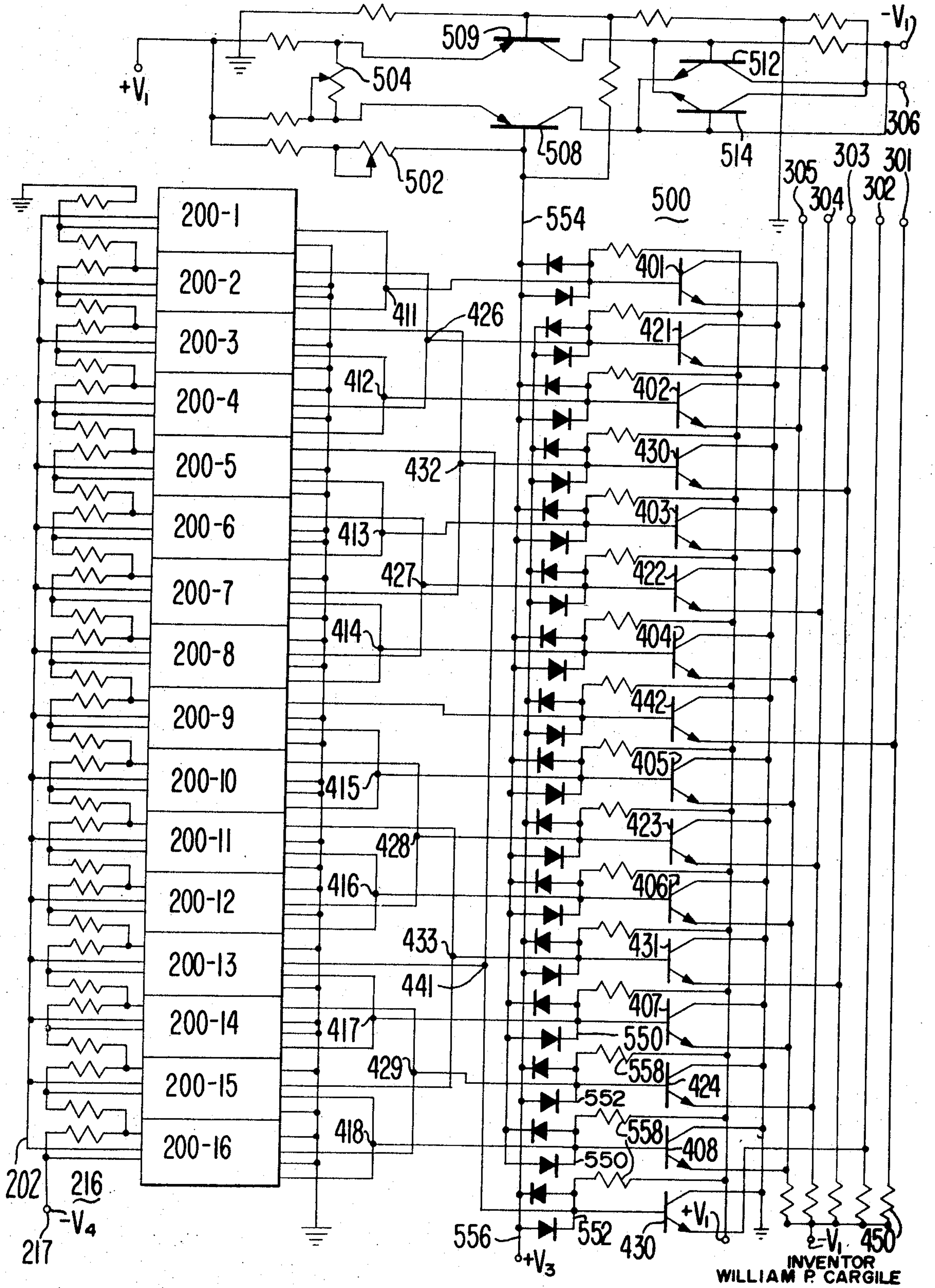
FIG. 2 is a schematic circuit diagram, partially in block form, of a preferred embodiment of the analog-to-digital converter according the instant invention.

FIG. 2 shows an embodiment of the analog-to-digital (A/D) converter according to the present invention. A six-bit Gray code is generated in response to the analog input by using a five-bit simultaneous approximation and by making use of certain current levels in the circuit to generate the sixth bit. Simultaneous approximation requires $2^n$ comparators, where $n$ = bit length. Thus, the novel converter described herein permits a theoretical reduction from $2^6$ or 64 down to $2^5$ or 32 comparators. In the practical embodiment shown, 31 comparators are employed in order to sense 0 through 32 levels. A relatively straight-forward circuit employing only a few transistors generates the sixth bit. A substantial economy in circuit components is thereby derived. In addition, substantially less analog signal driving power is required for the smaller number of comparators.

The A/D converter is unclocked, thus providing fast, accurate conversion in a straightforward manner.

Figure 3:
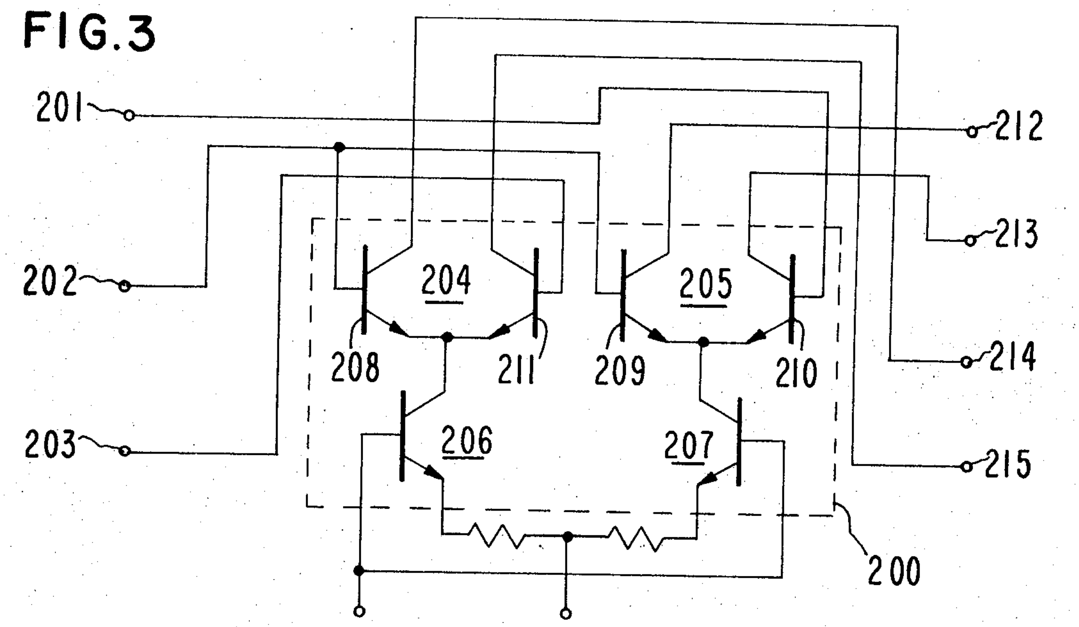
FIG. 3 is a schematic circuit diagram of the voltage comparator used in the analog-to-digital converter of FIG. 2.

FIG. 3 shows a conventional voltage comparator 200 used in the A/D converter of FIG. 2, and for greater ease in understanding the operation of FIG. 2, it will be described first. Comparators 200–2 through 200–16 are identical; comparator 200-1 differs slightly as will be described below. Reference DC voltages are applied to terminals 201 and 203; as will be seen in the discussion of FIG. 2, these voltages are different for each terminal up the comparator string, and are chosen to provide 32 sensing levels converting the dynamic range of the analog input signal. The analog signal is applied to terminal 202 of every comparator. Each comparator 200 is comprised of two differential pairs 204 and 205, each having an associated constant current source 206 and 207, respectively. The measured signals are applied to the bases of the left hand transistor 208 and 209 of each pair; the reference voltage on input 201 is applied to the base of the right hand transistor 210 of pair 205; and the reference voltage on input 203 is applied to the base of right hand transistor 211, of pair 204. Thus, in the conventional manner when the reference voltage ($v_{ref}$) at 201 is greater than the measured voltage ($v_{meas}$) at 202, 210 conducts output 213 is "down" and 212 is "up," in like manner. If $v_{meas}$ at 202 is greater than $v_{ref}$ at 203, 208 conducts and output 214 is "down" and 215 is "up". This type of comparator is well known in the art and a further discussion of it is deemed unnecessary.

Referring again to FIG. 2, the three left hand inputs of comparators 200-2 through 200-16 are as in FIG. 3; the measured analog input is at terminal 202; a bank of resistors 216 connected to a negative DC supply source $-v_4$ at terminal 217, provides the DC reference voltage at terminals 201 and 203. Comparator 200-1 has only a single reference voltage input because it consists of a single comparator 204. The right hand outputs, 212–215 of comparators 200-2 through 200-16 are in the same sequence as shown in FIG. 3. Comparator 200-1 has output 213–215; output 212 is not necessary because the output for minimum input signal level is never needed by the coder as will be seen below.

Before setting the connection at the output of comparator 200, a discussion of the theory behind these connections will be undertaken so that the description of the circuit will be more meaningful.

A common problem in code converters is that of certain transitions in the code output. For example, the major transition between "15" and "16" in a straight binary code: 01111 to 10000. At this major transition every digit of the code changes. Because of differing propagation times in portions of the digital circuitry, erroneous values can appear until all the digits have changed their values. One way of overcoming this problem in the prior art is to inhibit the system output until the transition is completed. A better way, resulting in shorter time delay is to use a cyclic code, such as the Gray code, wherein no more than one bit changes at a transition. The problem of transitions in generating a Gray code is avoided by eschewing the conventional arbitrary network of gates approach. Instead a novel arrangement is employed that utilizes certain patterns in the code itself, as will be understood from the discussion hereinafter. The six bit code at outputs 301–306 of the A/D converter of FIG. 2 is chosen to be a Gray code in this example, although another cyclic code could be employed using the principles herein disclosed. Output 301 is the most significant bit; 306, the least significant.

For purposes of understanding the Gray code generator, a simpler case of a three-bit code is considered, however, the same theory applies to the 5-bit generator embodiment shown in FIG. 2, and to any cyclic code having any random order of columns and starting anywhere within a column. The only constant is that the code change by only one bit between each level.

A three-bit Gray code has eight levels:

000
001
011
010
110
111
101
100

Let the column having the most level transitions (1 to 0; 0 to 1) be column 1. (4 transitions), the next most, column 2 (2 transitions), the next most, column 3 (1 transition). For an $n$-bit code, there would be a 1, 2, 3 . . . $n$ columns wherein the number of transitions in a column is $2^{n-y}$, where $y$ is the column number. Within each column, the transitions are spaced apart $2^y$ spaces. The column may be considered circular, i.e., it closes on itself. Let the spaces between each code level be associated with a voltage level $z$, where $z \leq 2^n-1$. Thus the space between each code level in a column may be defined by a variable $X_{yz}$, where $y$ is the column and $z$ is a voltage sensing level. If $X_{yz}$ is taken to change from "0" to "1" at the space at which there is a transition in column $y$ and if $Q_y$ is the value of the code (1 or 0) between the transitions in column $y$, then a relationship between the voltage sensing levels and generated code columns can be set forth. Thus, for the example of the three bit Gray code the variables $X_{yz}$ at transitions are $X_{11}$, $X_{13}$, $X_{15}$, $X_{17}$, $X_{22}$, $X_{26}$, and $X_{34}$. Note that each voltage sensing level $z$ is looked at only once for each code column. The values of Q for the consecutive transitions are:

| Between transitions: | The value of $Q_y$ is: |
|---|---|
| $X_{11}$ to $X_{13}$ | 1 |
| $X_{13}$ to $X_{15}$ | 0 |
| $X_{15}$ to $X_{17}$ | 1 |
| $X_{22}$ to $X_{26}$ | 1 |
| $X_{34}$ | 1 |

The variables are plugged into the following Boolean relationship for each column:

column 1

$Q_1(X_{11} \cdot \overline{X}_{13}) + Q_1(X_{13} \cdot \overline{X}_{15}) + Q_1(X_{15} \cdot \overline{X}_{17})$ column 2

$Q_2(X_{22} \cdot \overline{X}_{26})$ column 3

$Q_3(X_{34})$ which yields:

column 1

$(X_{11} \cdot \overline{X}_{13}) + (X_{15} \cdot \overline{X}_{17})$ column 2

$(X_{22} \cdot \overline{X}_{26})$ column 3

$X_{34}$.

Figure 4:
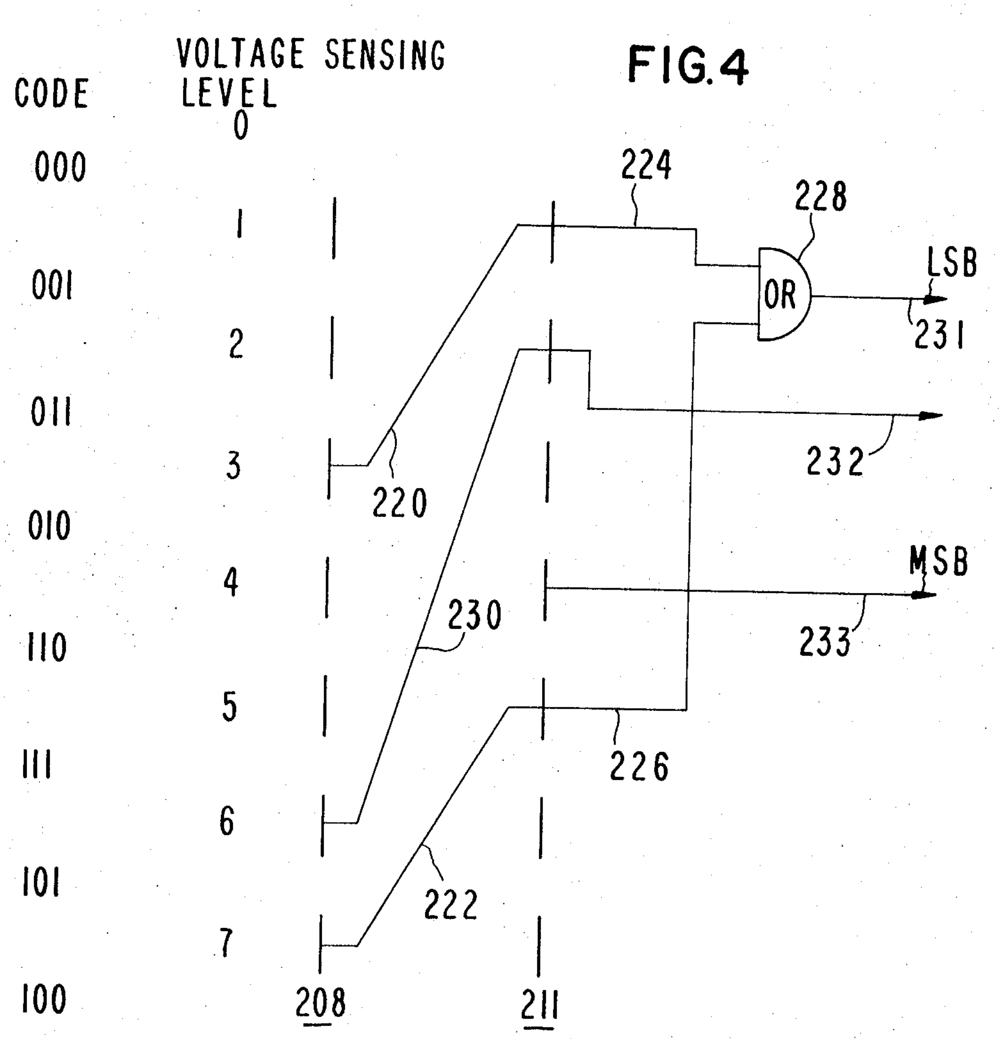
FIG. 4 is a schematic type diagram useful in understanding the operation of the analog-to-digital converter of FIG. 2.

These logic relations indicate that column 1 of the code may be generated by logically "ANDing" voltage sensing level 1 with the complement of voltage sensing level 3, and "ORing" that result with the result of "ANDing" voltage sensing level 5 with the complement of voltage sensing level 7. Thus, as shown in FIG. 4, since the voltage sensing level and its complement are generated for every level (the left side being the complement), the least significant bit column (or the column having the most transitions) is derived by connecting the left hand side of level 3 with the right hand side of level 1 by means of an OR-tie 220 (an OR-tie is simply a connection between the collectors of NPN transistors — it functions as a positive AND gate, or negative OR gate), by OR-tieing the left hand of level 7 to the right hand of level 5 in line 222 and by connecting the two on lines 224 and 226 to an OR gate 228 (as transistors 401, 421, etc. in FIG. 2) to provide the least significant bit (LSB) on line 231. The middle bit is derived on line 232 from an OR-tie connection 230 between the right hand of level 2 and the left hand of level six. The most significant bit (MSB) is derived on line 233 from the right hand of level 4.

The generation of the code may be verified as follows: signal right hand collectors at levels

| level | 1 | 2 | 3 | 54 | 6 | 7 |
|---|---|---|---|---|---|---|
| 1 | 1 | 0 | 0 | 00 | 0 | 0 |
| 2 | 1 | 1 | 0 | 00 | 0 | 0 |
| 3 | 1 | 1 | 1 | 00 | 0 | 0 |
| 4 | 1 | 1 | 1 | 01 | 0 | 0 |
| 5 | 1 | 1 | 1 | 11 | 0 | 0 |
| 6 | 1 | 1 | 1 | 11 | 1 | 0 |
| 7 | 1 | 1 | 1 | 11 | 1 | 1 |

| | $1 \cdot \overline{3}$ | $5 \cdot \overline{7}$ | $(1 \cdot \overline{3}) + (5 \cdot \overline{7})$ |
|---|---|---|---|
| 1 | 1 | 0 | 1 |
| 2 | 1 | 0 | 1 |
| 3 | 0 | 0 | 0 |
| 4 | 0 | 0 | 0 |
| 5 | 0 | 1 | 1 |
| 6 | 0 | 1 | 1 |
| 7 | 0 | 0 | 0 |

| | $2 \cdot \overline{6}$ | 4 |
|---|---|---|
| 1 | 0 | 0 |
| 2 | 1 | 0 |
| 3 | 1 | 0 |
| 4 | 1 | 1 |
| 5 | 1 | 1 |
| 6 | 0 | 1 |
| 7 | 0 | 1 |

It will be seen that lines 2–8 of the code are verified; line one is 000, a default value, and does not require the use of comparators.

A generalized expression for connecting the comparators for any cyclic code of any bit length may be found by deriving the logical connections of the voltage sensing levels through the relationship:

$$F_y = Q_y(X_{yz'} \cdot \overline{X_{y(z'+1\cdot 2y)}}) + Q_y(X_{y(z'+1\cdot 2y)} \cdot \overline{X_{y(z'+2\cdot 2y)}}) + Q_y(X_{y(z'+2\cdot 2y)} \cdot \overline{X_{y(z'+3\cdot 2y)}}) + Q_y[(X_{y(z'+(n-1)\cdot 2y)}) \cdot (\overline{X_{y(z'+n\cdot 2y)}})]$$

where (1) $F_y$ generates the code for column $y$; $1 \leq y \leq n$;

(2) the variable $X_{yz}$ changes from "0" to "1" at transition (voltage sensing level) $z$; $1 \leq z \leq 2^{n-1}$ and $X_{yz}$ = "0" for $z \geq 2^{n-1}$, $X_{yz}$ corresponding to the signal at each reference level and $\overline{X_{yz}}$ corresponding to the complement of the voltage at each reference level;

(3) $Q_y$ = value of the desired output code (for column $y$) between transition $X_{yz}$ and $X_{y(z+2}$ ); and (4) $z'$= voltage sensing level at which the first transition occurs in column $y$.

In essence, the relationship uniquely associates voltage sensing levels to code column transitions, then connects the levels in a logic pattern to generate the respective code columns in response to the analog signal thereby solving the classic problem of converting $n$-inputs to $m$-outputs with a small amount of hardware.

Referring again to FIG. 2, and momentarily ignoring the generation of the least significant bit for use at output 306, assume that the output at 305 is the least significant bit. The emitters of transistors 401–408 are connected together to output 305 and function as "OR" gates having gain with respect to the inputs to their respective bases. The emitters are also connected to a negative DC supply source, $-v_1$ through one of resistors 450. The collectors of transistors 401–408 are connected to ground. The bases of "OR" gate transistors 401–408 are connected respectively to "OR" ties 411 to 418. The "OR" ties are connected to the voltage comparators in the same type of pattern described above in order to generate the least significant bit of a 5-bit Gray code at output 305. For the moment, the interconnected diodes and resistors will be ignored.

The next most significant bit, at output 304, is taken from amplifying "OR" gates 421–424 consisting of transistors whose emitters are connected to 304 and to $-v_1$ through a resistor 450, and whose base inputs are connected to "OR" ties 426–429. The collectors are connected to ground.

The next most significant bit at 303 is taken from the emitters of transistors 430 and 431 constituting "OR" gates. The emitters are also connected to $-v_1$ through a resistor 450. The collectors are connected to $+v_2$. The input bases of 430 and 431 are connected respectively to "OR" ties 432 and 433.

The next most significant bit, at output 302, is taken from the emitter of transistor 440, which acts only as an amplifier. The emitter is also connected to $-v_1$ through a resistor 450 and the collector is connected to ground. The base input of 440 connected to "OR" tie 441.

The most significant bit at output 301, is taken from the emitter of transistor 442, which acts only as an amplifier. The base input is connected to output 212 of comparator 200-9.

Referring now to the remaining portions of FIG. 2, a first and second of back-to-back diode pairs 550 and 552 are connected in the following manner: diode pairs 550 have one cathode-anode junction connection to line 554 that is connected to sixth bit generator circuit 500; diode pairs 552 have one cathode-anode junction connected to line 556 that is connected to a low-impedance DC reference potential $+v_3$. The second cathode-anode junction of each diode pair 550 and 552 are respectively connected through resistors 558 to the source $+v_1$ and the junctions are further connected to the base of each associated transistor down the string.

One obvious purpose for the diode pairs is to clamp the comparator collectors to a maximum and minimum voltage, less than $+v_1$. However, the clamp diodes and their associated bus lines 554 and 556 are utilized in a unique way in conjunction with sixth bit generator circuit 500. It will be noted initially that bus (or clamp) line 554 is associated with only the transistors providing an output at 305, the fifth least significant bit. The current going into the bases of the transistors 401, 421, etc. is quite small and may be assumed to be essentially zero.

The comparators 200 supply or send a constant current that therefore must go into the clamp bus 554. In the "0" state the current can be called –I; in the "1" state, +I. The total current in bus line 554 therefore takes on one of two discrete levels:

−6I or −8I. The transitions between −6I or −8I may be utilized to manufacture or generate the sixth bit. Circuit 500 is a circuit adapted to generate the sixth bit, in response to the bus line current variations; other circuits may occur to those of ordinary skill in the art once having the teaching herein to use the clamp line current variations.

Figures 5A, 5B, 5C:
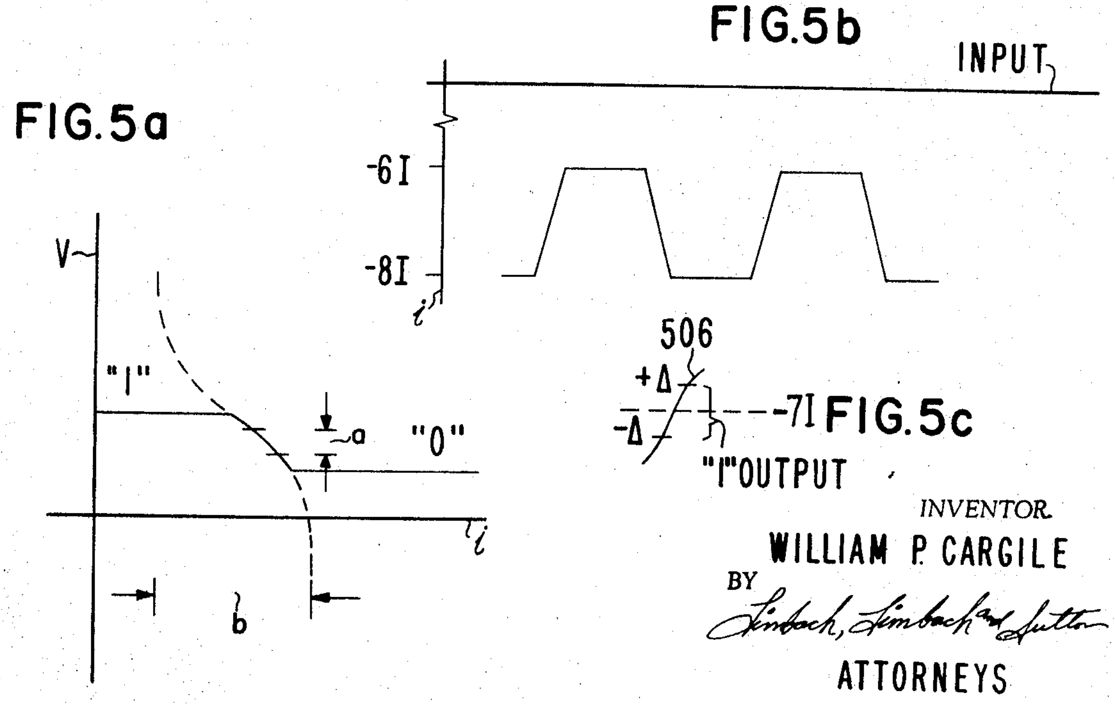
FIG. 5*a* is a graph of current variations in a portion of the circuit of FIG. 2.
FIGS. 5*b* and 5*c* are graphs of certain parameters useful in understanding the operation of FIG. 2.

In order to understand better the derivation of the least significant bit from the clamp line current variations, one should consider the current and voltage variations occurring at the collector of a comparator, such as at a terminal 212. FIG. 5a roughly depicts the current-voltage variations; the dotted lines indicate the variation without the clamping diodes. Switching from the "up" to "down" state occurs in the finite inverval "*a*". However, it is apparent that the current is undergoing a significant change before the switching point is reached. That is, as the input analog signal changes, the current is varying over the range "*b*" although the collector is normally clamped at the "1" voltage or "0" voltage. This anticipation of a change makes it possible to use the current variations in constructing the sixth bit. The following table may be helpful; the left-hand column is the fifth bit of the Gray code, with each bit written twice; the right-hand column is the least significant bit which it is desired to generate:

0 0
0 1
1 1
1 0
1 0
1 1
0 1
0 0
0 1
etc.

It will be seen that the ones of the least significant bit occur before and after each zero-one, one-zero transition of the previous bit. Thus the bit may be generated by producing a one during the last half and first half of the bits occurring at the transitions. Since the clamp current anticipates the transitions it is possible to provide a circuit that will so generate the least significant bit.

Circuit 500 can be better understood by referring first to FIGS 5b and c. In FIG. 5b the current variation on the clamp line 554 versus input signal is shown. Due to the effects shown in FIG. 5a, the signal is not a perfect rectangular wave but has a definite rise time and fall time. By generating a "one" output as the sixth bit at the transition times, an essentially correct six bit Gray code results from the system on line 301–306.

Circuit 500 operates essentially as a dual limit comparator with variable gain and offset. Such devices are well known. A replica of the current signal of FIG. 5b is generated by differential comparators 508,509. Transistors 512,514 function as a dual threshold detector feeding an OR tie 305. The circuit is biased at −7I and looks for swings +*d* and −*d*, above and below −7I. Potentiometer 502 sets the bias reference level as shown in FIG. 5c. Potentiometer 504 by controlling the gain sets the slope of line 506 to thereby adjust the length of the "one" output on line 306. A "one" is generated during the transitions between −8I and −6I and vice-versa, while the current signal passes through the −*d* to +*d* region.

Figure 6:
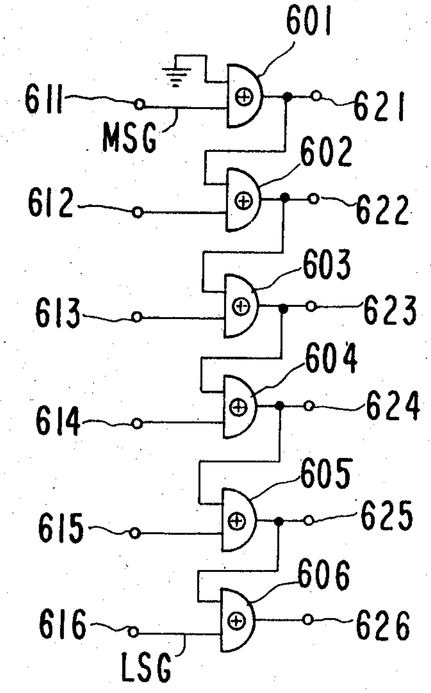
FIG. 6 is a schematic circuit diagram of an embodiment of the Gray code to binary code converter according to the present invention.

Referring now to FIG. 6 of the drawings wherein an embodiment of the Gray code to binary code converter is shown as a bank of exclusive OR gates 601–606. Line 611 to 616 provide one input respectively to each of gates 601–606; line 611 is the most significant Gray bit, line 616 the least significant Gray bit. In order to better understand the operation of Gray to binary converters, the following chart will be helpful. To simplify the chart, a three bit code is shown.

| Gray | Binary |
|---|---|
| 000 | **000** |
| 001 | **001** |
| 011 | **010** |
| 010 | **011** |
| 110 | **100** |
| 111 | **101** |
| 101 | **110** |
| 100 | **111** |

It will be seen that the first bit of both codes is identical, that the second bits are the same above the center line and inverted below; that the third bits are the same above the top and bottom lines and inverted below. The same pattern holds for any bit length. Recognizing this, a simple converter comprising exclusive OR gates is possible.

An exclusive OR gate provides a "one" output only when its inputs are different.

As an example, assume the input on lines 611–616 is 100000, the largest Gray code number. The desired binary output would be 111111. Line 611 is 1, the other input to gate 601 is always zero (ground), hence output 621 is 1, which is also applied to gate 602. The other input to gate 602 is 0, hence the output 622 is 1, and so on down the line.

Figure 7:
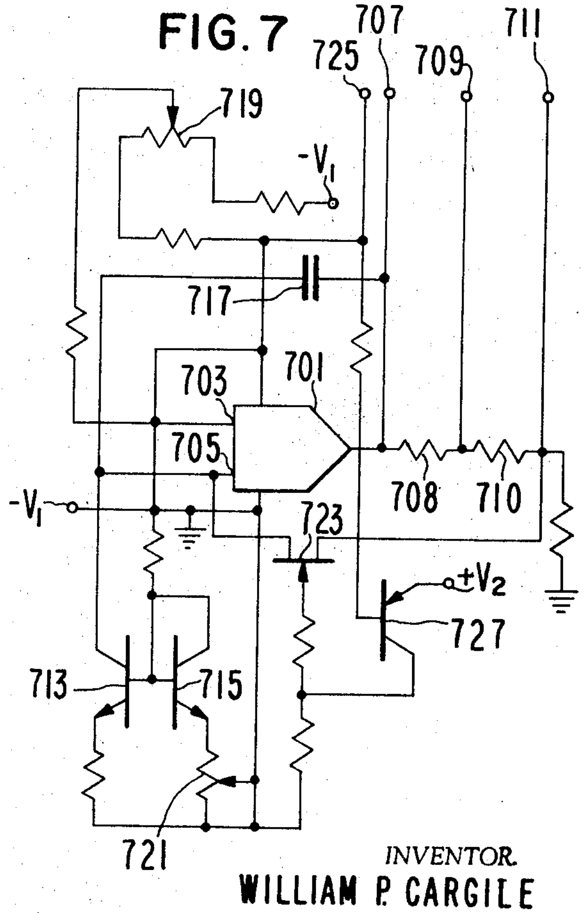
FIG. 7 is a schematic circuit diagram of an embodiment of the ramp generator according to the present invention.

Referring now to FIG. 7 an embodiment of the ramp generator is shown having a high gain operational amplifier 701 with a positive input 703 and a negative input 705. The generator provides horizontal sweep output of X10, X5 and X1 at outputs 707, 709 and 711 respectively, taken across dropping resistors 708 and 710. PNP transistors 713 and 715 act as a current source for the integrating feedback capacitor 717. Potentiometer 719, providing an adjustable voltage from a supply source $-v_1$ to the positive input of operational amplifier 201 functions as a horizontal position control.

Potentiometer 721 provides horizontal gain control. An FET device 723 controlled by control logic on line 725 and NPN transistor 727 resets the ramp by clamping the operational amplifier output to the negative input through resistors 708 and 710, thus achieving a very rapid reset action. Thus by establishing a new feedback path, the amplifier discharges the capacitor thus causing zero input to the amplifier. Transistor 727 functions as a level translator. Any type of switch may be employed instead of FET 723, such as a transistor or a relay.

What is claimed is:

1. Apparatus for recording a plurality of points of an input analog signal in response to a command signal comprising:
   analog-to-digital converter means for providing a digital code signal having *n*-bit words corresponding to points of said input signal,
   memory means for storing *w n*-bit digital code signal words, where *w* is a positive integer,
   means responsive to said command signal for reading said digital code signal into said memory means at a first rate, and
   means responsive to a further command signal for recirculating stored digital code words in said memory means.
2. Apparatus according to claim 1 further comprising:
   means for generating a trigger signal and for applying said trigger signal as said command signal to said memory means read in means; and
   means for selectively delaying said trigger signal for a time of zero or greater.
3. Apparatus according to claim 2 wherein said trigger signal is generated in response to an external signal.
4. Apparatus according to claim 2 wherein said trigger signal is generated internally in response to a predetermined point on said analog signal, said trigger signal occurring repetetively in response to a cyclic input signal.
5. Apparatus according to claim 2 wherein said trigger signal is generated internally in response to the first occurrence of a predetermined point on said input analog signal.
6. Apparatus according to claim 1 further comprising:
   means operable in a pre-trigger mode of said apparatus for applying said command signal and said further command signal to initially continuously recirculate and update stored digital code words in said memory means; and means responsive to a predetermined point on said analog input signal for interrupting said further command signal to stop recirculation of code words in said memory means.

7. Apparatus according to claim 6 further comprising means for selectively delaying the interruption of said further command signal.

8. Apparatus according to claim 1 wherein said apparatus is further for reading out said recorded signal, said apparatus further comprising:

means for selectively reading said digital code words out of said memory means at a second rate slower than said first rate.

9. Apparatus according to claim 6 wherein said apparatus is further for reading out said recorded signal, said apparatus further comprising:

means for selectively reading said digital code words out of said memory means at a second rate slower than said first rate.

10. Apparatus for recording an input analog signal using a digital code having $n$-bit words wherein each bit column of said code has an assigned value $y = 1,2,3 \ldots n$ in descending order in accordance with the number of level transitions in the bit column, each bit column having $2^{n-y}$ transitions and $2^y$ spaces between transitions, comprising:

analog-to-digital converter means for providing a digital code signal having $n$-bit words in response to said input signal;

memory means receiving said digital code signal for storing $w$ $n$-bit words of said code, where $w$ is a positive integer;

said analog to digital converter means comprising:

means for simultaneously comparing said signal with reference voltages at $z = 2^n - 1$ discrete voltage levels;

means for generating a signal having a first polarity representative of 1 at each reference level at which said signal exceeds said reference voltage and having a second polarity representative of 0 at each reference level at which said reference level exceeds said signal;

means for generating the complement of said signal at each reference level;

means for connecting said first and second polarity signals and said first and second polarity signal complements according to the relationship:

$$F_y = Q_y(X_{yz'} \cdot \overline{X_{y(z'+1\cdot 2^y)}}) + Q_y(X_{y(z'+1\cdot 2y)} \cdot \overline{X_{y(z'+2\cdot 2^y)}})$$

$$+ Q_y(X_{y(z'+2\cdot 2^y)} \cdot \overline{X_{y(z'+3\cdot 2^y)}})$$

$$+ Q_y[(X_{y(z'+(n-1)\cdot 2^y)}) \cdot (\overline{X_{y(z'+n\cdot 2^y)}})]$$

where

1. $F_y$ generates the code for column $y$;
$1 \leqslant y \leqslant n$;
2. the variable $X_{yz}$ changes from "0" to "1" at transition (voltage sensing level) $z$; $1 \leqslant z \leqslant 2^{n-1}$ and $X_{yz}$ = "0" for $z \geqslant 2^{n-1}$, $X_{yz}$ corresponding to the signal at each reference level and $X_{yz}$ corresponding to the complement of the voltage at each reference level;
3. $Q_y$ = value of the desired output code (for column $y$) between transition $X_{yz}$ and $X_y(z+2^y)$; and
4. *$z'$ = voltage sensing level at which the first transition occurs in column y.*

11. Apparatus according to claim 10 wherein said analog-to-digital converter means further comprises means for sensing the current variations in said voltage sensing levels associated with said bit column for which $y = 1$, means for generating current sense signal of a first polarity when said current variations fall within two predetermined levels and for generating a signal of a second polarity when said current variations fall outside said levels.

12. Apparatus for converting an analog signal waveform to digital form and for storing said digital signal in a memory during a record mode of operation and for reading out said digital signal from said memory during a playback mode of operation comprising a. triggering means receiving said analog signal for generating a trigger pulse at predetermined point on the wave form of said signal,
b. means for providing an adjustable rate clock signal,
c. analog-to-digital converter means receiving said analog signal for converting said signal to cyclic digital code words of $x$-bit length.
d. memory means for storing $w$ digital code words of $n$-bit length in a recirculating format said memory having 1 through $w$ discrete word addresses, at least one of said addresses being available for reading in or reading out a code word at a particular time,
e. memory tracking counter means for indicating the address of the code word available at said memory means,
f. interlace index counter means for indicating the memory means address at which the next code word is to be read-in or read-out,
g. means for comparing addresses of said memory tracking counter means and said interlace index counter means for generating a coincidence pulse upon coincidence of said addresses,
h. control logic means receiving said clock pulses, said trigger pulses, and said coincidence pulses for providing read-in and read-out pulses,
i. input buffer register means receiving said digital code words from said converter means and said read-in pulses for reading in a code word to said memory means upon receipt of a read in pulse,
j. output buffer register means for reading out a code word from said memory upon receipt of a read-out pulse,

13. Apparatus according to claim 12 further comprising means receiving said read-out code word for converting said cyclic digital code word to a binary digital code word.

14. Apparatus according to claim 13 further comprising digital-to-analog converter means receiving said binary code word for converting said code word to an analog signal.

15. A method of generating a digital code having two levels and having words of $n$-bit length in response to measured analog signal voltages comprising a. assigning a value $y = 1,2,3, \ldots n$ to each bit column of the code in descending order in accordance with the number of level transitions in the bit column, the number of transitions in each bit column being $2^{n-y}$, the number of spaces between transitions in a column being $2^y$,
b. simultaneously comparing said measured signal voltage with reference voltages at $z = 2^n - 1$ discrete voltage levels,
c. generating a signal having a first polarity representative of 1 at each reference level at which said signal exceeds said reference voltage and having a second polarity representative of 0 at each reference level at which said reference level exceeds said signal,
d. generating the complement of said signal at each reference level,
e. defining a relationship among the voltage sensing levels according to the relation:

$$F_y = Q_y(X_{yz'} \cdot \overline{X_{y(z'+1\cdot 2^y)}}) + Q_y(X_{y(z'+1\cdot 2y)} \cdot \overline{X_{y(z'+2\cdot 2^y)}})$$

$$+ Q_y(X_{y(z'+2\cdot 2^y)} \cdot \overline{X_{y(z'+3\cdot 2^y)}})$$

$$+ Q_y[(X_{y(z'+(n-1)\cdot 2^y)}) \cdot (\overline{X_{y(z'+n\cdot 2^y)}})]$$

where

1. $F_y$ generates the code for column $y$; $1 \leqslant y \leqslant n$;
2. the variable $X_{yz}$ changes from "0" to "1" at transition (voltage sensing level) $z$; $1 \leqslant z \leqslant 2^{n-1}$ and $X_{yz}$ = "0" for $z \geqslant 2^{n-1}$, $X_{yz}$ corresponding to the signal at each reference level and $\overline{X_{yz}}$ corresponding to the complement of the voltage at each reference level;
3. $Q_y$ = value of the desired output code (for column $y$) between transition $X_{yz}$ and $X_{y(z+2}$ ); and
4. *$z'$ = voltage sensing level at which the first transition occurs in column y.* f. connecting the voltage sensing levels according to the defined logic relationship.

16. Apparatus for generating a digital code having two levels and having words of $n$-bit length in response to measured analog signal voltages, each bit column of the code having an assigned value $y = 1,2,3 \ldots n$ in descending order in accordance with the number of level transitions in the bit column, each bit column having $2^{n-y}$ transitions and $2^{y}$ spaces between transitions the combination comprising a. means for simultaneously comparing said signal with reference voltages at $z = 2^{n}-1$ discrete voltage levels, b. means for generating a signal having a first polarity representative of 1 at each reference level at which said signal exceeds said reference voltage and having a second polarity representative of 0 at each reference level at which said reference level exceeds said signal, c. means for generating the complement of said signal at each reference level, d. means for connecting said first and second polarity signals and said first and second polarity signal complements according to the relationship:

$$F_y = Q_y(X_{yz'} \cdot \overline{X_{y(z'+1\cdot 2^{y})}}) + Q_y(X_{y(z'+1\cdot 2^{y})} \cdot \overline{X_{y(z'+2\cdot 2^{y})}})$$

$$+ Q_y(X_{y(z'+2\cdot 2^{y})} \cdot \overline{X_{y(z'+3\cdot 2^{y})}})$$

$$+ Q_y[(X_{y(z'+(n-1)\cdot 2^{y})}) \cdot (\overline{X_{y(z'+n\cdot 2^{y})}})]$$

where

1. $F_y$ generates the code for column $y$; $1 \leq y \leq n$;
2. the variable $X_{yz}$ changes from "0" to "1" at transition (voltage sensing level) $z$; $1 \leq z \leq 2^{n-1}$ and $X_{yz}$ = "0" for $z \geq 2^{n-1}$, $X_{yz}$ corresponding to the signal at each reference level and $\overline{X_{yz}}$ corresponding to the complement of the voltage at each reference level;
3. $Q_y$ = value of the desired output code (for column $y$) between transition $X_{yz}$ and $X_{y(z+2^{y})}$; and
4. $z'$ = voltage sensing level at which the first transition occurs in column $y$.

17. Apparatus for converting an analog signal waveform to digital form and for storing said digital signal in a memory during a record mode of operation and for reading out said digital signal from said memory during a playback mode of operation comprising:

a. triggering means receiving said analog signal for generating a trigger pulse at predetermined point on the waveform of said signal;

b. means for providing an adjustable rate clock signal;

c. analog-to-digital converter means receiving said analog signal for converting said signal to digital code words of $x$-bit length;

d. memory means for storing $w$ digital code words of $n$-bit length in a recirculating format said memory having 1 through $w$ discrete word addresses, at least one of said addresses being available for reading in or reading out a code word at a particular time;

e. memory tracking counter means for indicating the address of the code word available at said memory means;

f. interlace index counter means for indicating the memory means address at which the next code word is to be read-in or read-out;

g. means for comparing addresses of said memory tracking counter means and said interlace index counter means for generating a coincidence pulse upon coincidence of said addresses; and h. control logic means receiving said clock pulses, said trigger pulses, and said coincidence pulses for providing read-in and read-out pulses.

18. Apparatus according to claim 17 further comprising input buffer register means receiving said digital code words from said converter means and said read-in pulses for reading in a code word to said memory means upon receipt of a read-in pulse.

19. Apparatus according to claim 18 further comprising output buffer register means for reading out a code word from said memory upon receipt of a read-out pulse.

* * * * *

UNITED STATES PATENT OFFICE
CERTIFICATE OF CORRECTION

Patent No. 3,662,380 Dated May 9, 1972

Inventor(s) William P. Cargile

It is certified that error appears in the above-identified patent and that said Letters Patent are hereby corrected as shown below:

Column 7, lines 40-50, the columns headed by "54" should read as follows:

| | |
|---|---|
| 4 | 5 |
| 0 | 0 |
| 0 | 0 |
| 0 | 0 |
| 1 | 0 |
| 1 | 1 |
| 1 | 1 |
| 1 | 1 |

Column 8, line 8, "$X_{Y(z + 2\ )}$" should read -- $X_{Y(z + 2^{Y})}$-- .

Column 12, line 74, "$X_{Y(z + 2)}$ " should read -- $X_{Y(z + 2^{Y})}$ -- .

Signed and sealed this 12th day of December 1972.

(SEAL)
Attest:

EDWARD M.FLETCHER,JR.
Attesting Officer

ROBERT GOTTSCHALK
Commissioner of Patents